(12) United States Patent
Beach et al.

(10) Patent No.: US 6,347,109 B1
(45) Date of Patent: Feb. 12, 2002

(54) HIGH AVERAGE POWER SCALEABLE THIN-DISK LASER

(75) Inventors: Raymond J. Beach, Livermore; Eric C. Honea, Sunol; Camille Bibeau, Dublin; Stephen A. Payne, Castro Valley; Howard Powell, Livermore; William F. Krupke, Pleasanton; Steven B. Sutton, Manteca, all of CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 09/237,142

(22) Filed: Jan. 25, 1999

(51) Int. Cl.[7] .......................... H01S 03/933; H01S 3/06
(52) U.S. Cl. ............................. 372/75; 372/36; 372/67
(58) Field of Search .............................. 372/75, 34, 67, 372/36

(56) References Cited

U.S. PATENT DOCUMENTS

| | | | |
|---|---|---|---|
| 5,307,430 A | * | 4/1994 | Beach et al. ................. 385/31 |
| 5,548,605 A | * | 8/1996 | Benett et al. ................. 372/36 |
| 5,553,088 A | * | 9/1996 | Brauch et al. ................ 372/34 |
| 5,859,868 A | * | 1/1999 | Kyusho et al. ............... 372/75 |
| 5,936,984 A | * | 8/1999 | Meissner et al. ............. 372/75 |
| 6,101,201 A | * | 8/2000 | Hargis et al. ................ 372/98 |

* cited by examiner

Primary Examiner—James W. Davie
(74) Attorney, Agent, or Firm—Alan H. Thompson; Eddie E. Scott

(57) ABSTRACT

Using a thin disk laser gain element with an undoped cap layer enables the scaling of lasers to extremely high average output power values. Ordinarily, the power scaling of such thin disk lasers is limited by the deleterious effects of amplified spontaneous emission. By using an undoped cap layer diffusion bonded to the thin disk, the onset of amplified spontaneous emission does not occur as readily as if no cap layer is used, and much larger transverse thin disks can be effectively used as laser gain elements. This invention can be used as a high average power laser for material processing applications as well as for weapon and air defense applications.

47 Claims, 5 Drawing Sheets

HIGH AVERAGE POWER SCALEABLE THIN-DISK LASER

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to thin disk lasers, and more specifically, it relates to a means for scaling the transverse area of the laser gain sample to scale the average power of laser systems based on the thin disk laser.

2. Description of Related Art

U.S. Pat. No. 5,553,088 is directed to a laser amplifying system having a solid body arranged in a laser radiation field and including a laser active material that is pumped with a pumping light source. The solid body has a cooling surface and transfers heat created therein to a solid cooling element via the cooling surface. In this manner, a temperature gradient results in the solid body in a direction towards the cooling surface. The solid cooling element forms a carrier for the solid body. The laser radiation field propagates approximately parallel to the temperature gradient in the solid body. By enabling heat to be transferred to the solid cooling element via the cooling surface, this structure enables the solid body to be pumped at a high pumping power. Further, since the laser radiation field propagates approximately parallel to the temperature gradient in the solid body, the radiation field sees the same temperature gradient in all cross-sectional areas. Thus, the temperature gradient does not lead to an adverse effect on the beam quality of the laser radiation field at high pumping power.

Although the thin-disk or active mirror laser architecture is a well known and demonstrated approach to generating laser radiation, its ability to scale to high-average power is limited by transverse amplified spontaneous emission (ASE). The thin disk is motivated as a gain element for high beam quality lasers because heat is removed from the back face of the disk. This geometry leads to a situation in which the transverse thermal gradients in the laser gain sample are substantially reduced, and even completely eliminated. This allows the possibility of energy extraction in a high quality laser beam that suffers little of no optical distortion due to transverse thermal gradients.

To scale the average power of laser systems based on this approach, one must scale the transverse area of the laser gain sample. Although this scaling approach works up to a point, eventually the deleterious effects of transverse ASE limit further scaling. The present invention specifically addresses this ASE limitation to scaling by substantially reducing the solid angle over which spontaneously emitted photons are trapped in the laser sample. It is this reduction in the trapped solid angle of spontaneously emitted photons that enables the thin disk laser to be substantially scaled in power output beyond what has been available.

SUMMARY OF THE INVENTION

It is an object of the present invention to scale thin disk lasers to obtain high average power values.

Using a thin disk laser gain element with an undoped cap layer enables lasers to be scaled to extremely high average output power values. Ordinarily, the power scaling of such thin-disk is limited by the deleterious effects of amplified spontaneous emission. By using an undoped cap layer diffusion bonded to the thin disk, the onset of amplified spontaneous emission does not occur as readily as when no cap is used, and much larger transverse size thin disks can be effectively used as laser gain elements.

In a conventional thin disk laser system, pump radiation passes through a dichroic beamsplitter and an output coupler to optically pump a thin disk of laser material. Heat generated in the laser crystal is drawn away from the crystal, in the downward direction, into a cooling block. The laser resonator is formed by a highly reflective coating on the side of the thin disk laser sample that is in contact with the cooling block, and the output coupler laser mirror that is coated to allow the pump radiation to pass through it. The thin disk geometry insures that heat will flow substantially in the downward direction in the sample and so result in no thermal gradient in a direction transverse to the laser axis.

Due to the total internal reflection of spontaneously emitted photons within the thin disk at its large face that is not contacted to anything, amplified spontaneous emission limits the transverse size of the thin disk that can be efficiently utilized in a laser system. The present invention reduces the solid angle over which spontaneously emitted photons are trapped and so allows the transverse size of the thin disk to be substantially increased before the deleterious effects of ASE become apparent. The present invention is constructed with identical elements as in the conventional thin disk laser described above, with the addition of an undoped crystal affixed to the opposite side of the thin disk laser sample that is in contact with the cooling block. The undoped crystal is near index matched to the thin disk crystal.

The invention differs from the conventional thin disk geometry due to the inclusion of the undoped cap layer that, in one embodiment, is diffusion bonded to the laser crystal. Because the surface of the thin disk that was previously not contacted to anything is now contacted to an undoped crystal that is near index matched to the thin disk crystal, spontaneously emitted photons are not trapped by total internal reflection at this face of the thin disk. Because photons that impinge on this diffusion bonded surface are not confined to the gain loaded crystal, they are not as effective as they previously were in generating ASE. In effect, the use of the undoped cap layer has transformed the thin disk from a geometry in which ASE was largely trapped within the thin disk to a geometry in which the ASE is unconfined. The unconfined geometry of the diffusion bonded sample allows scaling to much higher power level lasers than would be possible without the use of the cap layer.

DETAILED DESCRIPTION OF THE INVENTION

Figure 1:
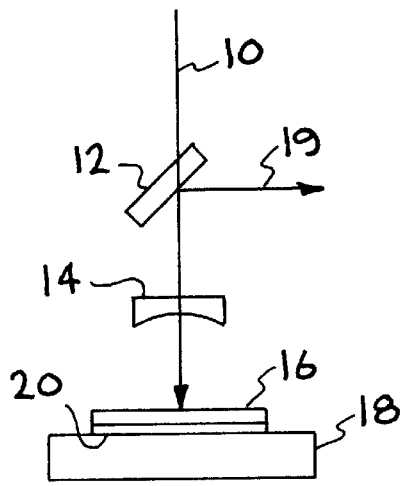
FIG. 1 shows a conventional thin disk laser system.

A conventional thin disk laser system is shown schematically in FIG. 1. Pump radiation 10 passes through a dichroic beamsplitter 12 and output coupler 14 to impinge on a thin disk 16 of laser material at, or near, normal incidence. Heat generated in the laser crystal 16 is drawn away from the crystal, in the downward direction in the figure, into the cooling block 18. The laser resonator is formed by a highly reflective coating 20 on the side of the thin disk laser sample 16 that is in contact with the cooling block 18, and the output coupler laser mirror 14 that is coated to allow passage of the pump radiation. An output beam 19 is shown in the figure to be reflected from dichroic beamsplitter 12. The thin disk geometry insures that heat will flow substantially in the direction of the cooling block 18 in the sample and so result in no thermal gradient in a direction transverse to the laser axis.

Figure 2:
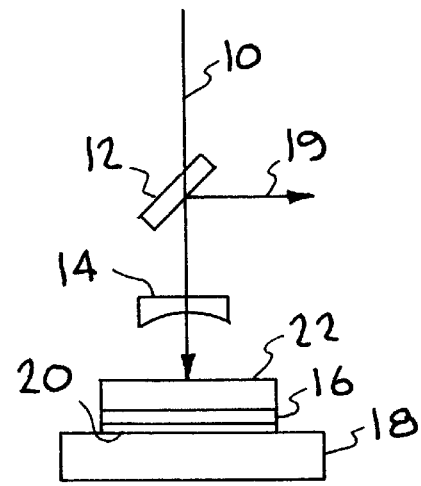
FIG. 2 shows the basic elements of the present invention, which is constructed with identical elements as described in FIG. 1 with the addition of an undoped crystal 22 affixed to the opposite side of the thin disk laser sample that is in contact with the cooling block.

Due to the total internal reflection of spontaneously emitted photons within the thin disk at its large face that is not contacted to anything, amplified spontaneous emission limits the transverse size of the thin disk that can be efficiently utilized in a laser system. The present invention reduces the solid angle over which spontaneously emitted photons are trapped and so allows the transverse size of the thin disk to be substantially increased before the deleterious effects of ASE become apparent. An embodiment of the gain medium of the present invention has a thickness that is less than about 1 mm. FIG. 2 illustrates the invention, which is constructed with identical elements as described in FIG. 1, with the addition of an undoped crystal 22 affixed to the opposite side of the thin disk laser sample 16 that is in contact with the cooling block 18. Undoped crystal 22 is near index matched to the thin disk crystal. The requirement on index matching can be stated in terms of the gain that would be seen by a ray traveling in the vertical direction of the thin disk shown in FIG. 2. Calling G the 1-way gain seen by such a ray, the gain seen by a ray that travels through the sample two ways, first down hitting the high reflector and then back up hitting the index matched interface, will be given by $G^2$. To ensure that the fractional energy of this ray which is reflected back into the sample on hitting the index matched interface is small so as not to contribute to amplified spontaneous emission, the condition that must be satisfied is $$G^2 R \ll 1$$

where R is the reflectivity due to any index mismatch at the diffusion bonded interface. Calling the index of the sample $n_0$, and the index mismatch between the sample and the capping layer $\Delta n$, the reflectivity R that would be seen by a ray intercepting the interface at normal incidence is given by $$R = (((n_0 + \Delta n)/n_0 - 1)/((n_0 + \Delta n)/n_0 + 1))^2.$$

Combining the previous two equations and solving for $\Delta n$, yields the condition to be satisfied by the index matching as $$\Delta n \ll 2n/(G-1).$$

Figure 3:
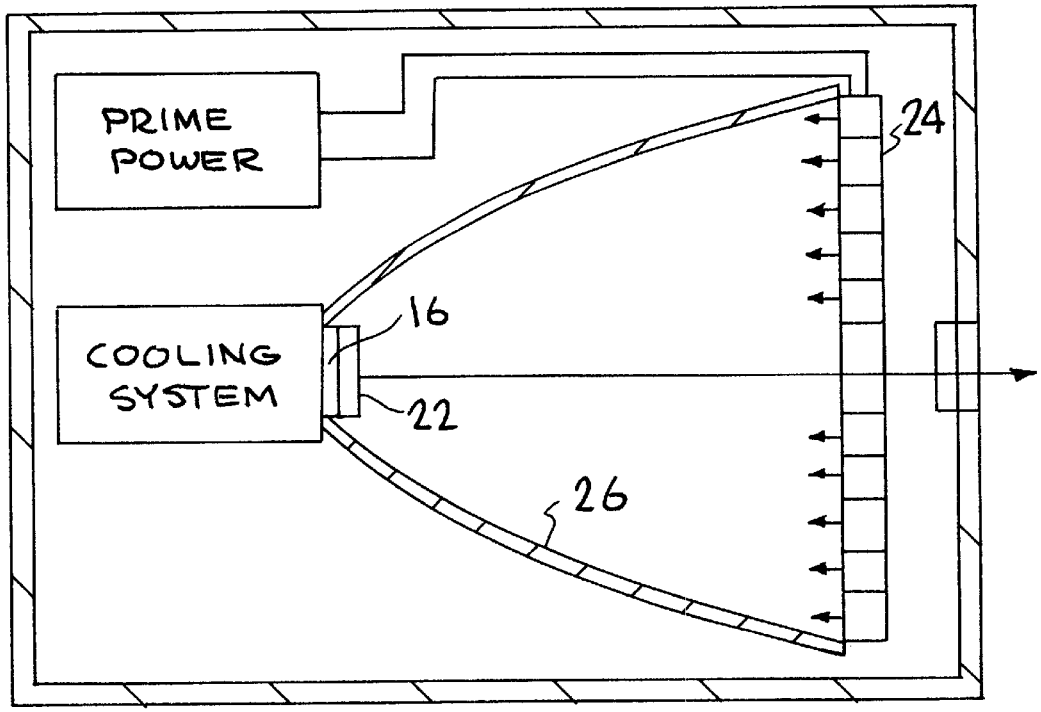
FIG. 3 shows a laser system based on this approach.

The invention differs from the conventional thin disk geometry due to the inclusion of the undoped cap layer 22 that, in one embodiment, is diffusion bonded to the laser crystal. Because the surface of the thin disk that was previously not contacted to anything is now contacted to an undoped crystal that is near index matched to the thin disk crystal, spontaneously emitted photons are not trapped by total internal reflection at this face of the thin disk. Because photons that impinge on this diffusion bonded surface are not confined to the gain loaded crystal, they are not as effective as they previously were in generating ASE. In effect, the use of the undoped cap layer has transformed the thin disk from a geometry in which ASE was largely trapped within the thin disk to a geometry in which the ASE is unconfined. By direct calculation, it has been shown that the unconfined geometry of the diffusion bonded sample allows scaling to much higher power level lasers than would be possible without the use of the cap layer FIG. 3 shows a laser system based on this approach. In one embodiment, the active laser crystal 16 is YbAG with $Yb^{3+}$ serving as the lasing ion. As in FIGS. 1 and 2, the laser crystal has an undoped, index-matched crystal 22 that is diffusion bonded to laser crystal 16. Pump radiation is delivered to the thin disk from a diode pump array 24, through a hollow non-imaging beam delivery optic 26 described below. The diode array is configured with a hole to allow the 1.03 $\mu$m laser radiation to exit.

Figure 4:
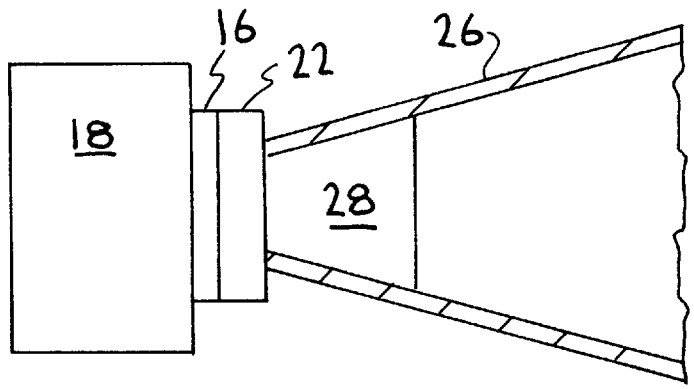
FIG. 4 shows an expanded view of the thin disk with a diffusion bonded cap layer.

FIG. 4 shows an expanded view of the thin disk 16 with a diffusion bonded cap layer 22. The pump radiation is delivered to the thin disk from the diode pump array shown in FIG. 3, and is focused by the hollow lensing duct 26 through the undoped crystal and onto the thin disk laser crystal 16. In one variation of this embodiment, a tapered undoped crystal 28 is placed between the hollow lens duct 26 and the undoped cap layer 22 to provide a further means for reducing ASE and to prevent the laser beam from damaging the hollow lens duct. The undoped cap layer 22 is attached to a high performance cooled backplane 18. The high performance cooled backplane 18 is described in U.S. Pat. No. 5,548,605 incorporated herein by reference. The incorporated patent is specifically directed to a monolithic microchannel heatsink. Although at the time of invention it was directed toward cooling diode arrays, the backplane cooler part of the invention is applicable to cooling any large two dimensional area as required in the present thin disk laser.

Figure 5A:
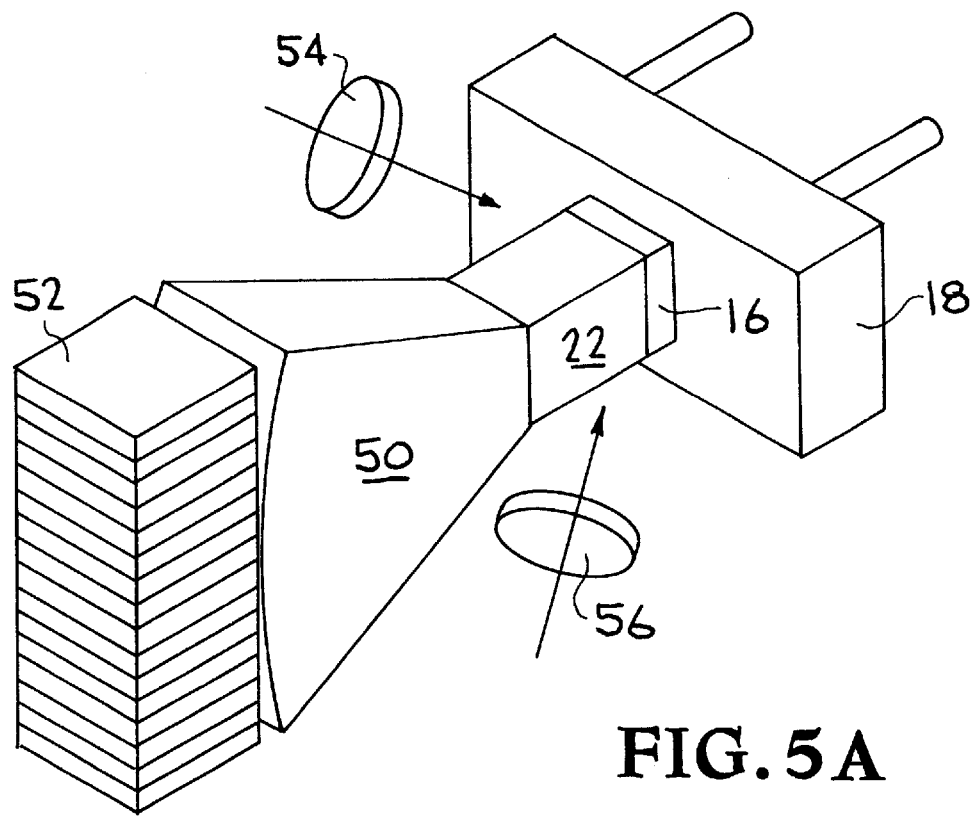
FIGS. 5A and 5B show a high average power gain module based on a thin disk, diffusion bonded to an undoped lens duct.
Figure 5B:
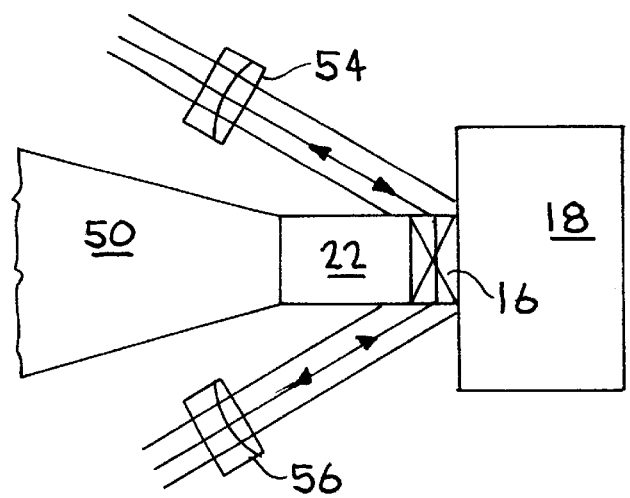

FIGS. 5A and 5B show a high average power gain module based on a thin disk 16 diffusion bonded to an undoped lens duct 50. In one embodiment, the thin disk 16 comprises Yb:YAG and the lens duct 50 comprises undoped YAG. Pump light from a laser diode array 52 is delivered through the undoped lens duct 50 onto the thin disk 16. Embodiments of lens duct designs usable in the present invention are described in U.S. Pat. No. 5,307,430, which is incorporated herein by reference. The cap layer 22 can be an integral part of the undoped lens duct 50, or can be another section of undoped, index matched material that is bonded (e.g., diffusion bonded) to the lens duct and the thin disk. The thin laser disk 16 is affixed directly to a microchannel backplane cooler 18, and does not include a highly reflective coating on the side of the thin disk laser sample that is in contact with the cooling block. This embodiment includes a brewster angled optical cavity comprising an output coupler 54 and a high reflector 56.

The hollow non-imaging beam delivery optic 26 that is included in the embodiments of FIGS. 3 and 4 avoids obstructing access to the end of the this laser disk by extending the basic idea disclosed in U.S. Pat. No. 5,307,430 to a hollow lens duct. These hollow lens ducts have a lens at their input end with a small hole located in the lens to allow optical access to the end of the laser rod or slab at which the lens duct is located.

Figure 6:
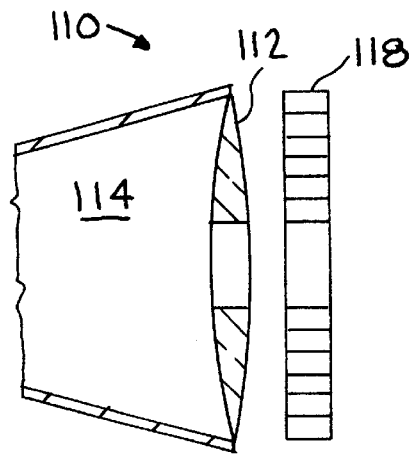
FIG. 6 shows the lens duct formed by a focusing lens and canted surfaces.

In FIG. 6, the lens duct 110 is formed by a focusing lens 112 and canted surfaces 114 that transfer pump light down to the small end of the lens duct where it is delivered to the thin disk laser (not shown). Additionally, the laser diode array 118 is configured to allow the laser cavity radiation to exit the pump delivery assembly without any interference from these components. In this laser configuration, pump light from laser diode array 118 is focused by lens duct 110 into the thin disk laser. In general the pump light that is delivered through the hollow lensing duct to the thin laser disk suffers some depolarization due to the fact that it may make multiple reflections in traversing the lensing duct that do not preserve polarization.

Figure 7:
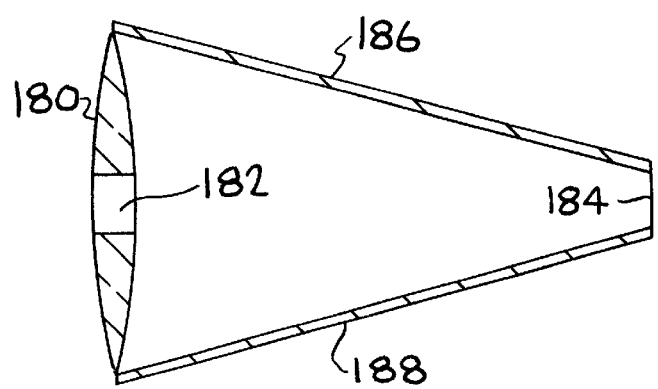
FIG. 7 shows a hollow lensing duct designed such that the focal length of the lens at the large end of the device has a focal length approximately equal to the axial length of the device.
Figure 8A:
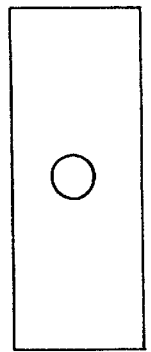
FIGS. 8A and 8B show that the sides of the hollow lensing duct can be continuously graded shapes that take a rectangular input end down to an output end, which may take on variously shaped exit holes beyond simple squares or circles, such as rectangles, octagons and ovals.
Figure 8B:
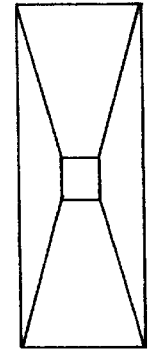

The hollow lensing duct shown in FIG. 7 is designed such that the focal length of the lens 180 at the large end of the device has a focal length approximately equal to the axial length of the device. This lens serves to focus down light, which approaches from the left-hand side in the figure, to a focal spot located near the end of the tapered region of the lensing duct. The hole 182 in the lens is located such that it is on the axis of the lensing duct and is approximately of the same size or slightly larger than the exit hole 184 at the small end of the lensing duct. The reflective sides 186, 188 of the hollow lens duct are shown to be planar. However, other configurations are possible. For example, the reflective sides can be continuously curved, as in a funnel, with a round input end and a round output end. Alternatively, as shown in FIGS. 8A and 8B, the sides can be continuously graded shapes that take a rectangular input end 190 down to an output end 192, which may take on variously shaped exit holes beyond simple squares or circles, such as rectangles, octagons and ovals.

The reflective sides of the lens duct can be fabricated by machining an appropriately shaped cavity in a solid piece of metal, followed by polishing, and, if appropriate, applying a highly reflective coating such as gold or silver. Alternatively, these sides can be made out of individual pieces of a material such as glass or metal with an appropriate metallic or dielectric coating applied to their surface so as to render them highly reflective.

The lens at the input surface will generally be an ordinary, commercially available lens that is modified by cutting it to the shape of the input aperture and by fabricating a hole in its center to allow optical access to the end of the laser rod or slab. Although the optical access hole 194 is shown to be round in FIG. 8A, it can have other shapes if appropriate. For example, if a hollow lens duct were to be used to pump a laser slab with a rectangular input aperture, then it might be advantageous to have the optical access hole fabricated with a rectangular cross-section to match this aperture.

The invention is usable in an aggressive laser architecture particularly suited to the needs of point defense for aircraft and ships: the High-Brightness Tactical Engagement Laser (High-BriTE). The laser employs a thin $Yb_3Al_5O_{12}$ gain element oriented such that the laser beam propagates along the same direction as the heat flow, resulting in no thermal distortions to first order. A more advanced embodiment of the laser system employs multiple thin $Yb_3Al_5O_{12}$ gain elements oriented such that the laser beam propagates along the same direction as the heat flow, resulting in no first order thermal distortions. By using an extremely thin gain element, operation is possible at very high thermal power densities before stresses rupture the material, resulting in unprecedented compactness and performance at high average powers. Furthermore, the output power of this design scales with the area of the gain region, which simultaneously increases the area over which heat is removed. Edge effects, which may result in some beam distortions, are also minimized at high power and large aperture. Modeling performed to date indicates that amplified spontaneous emission only becomes a limiting factor for output powers >100 kW. This system incorporates three innovations not presently used in solid-state laser systems: the use of high-purity $Yb_3Al_5O_{12}$ as the thin gain element in order to achieve the shortest possible pump absorption length while maintaining high thermal conductivity, a high-performance microchannel-cooled backplane capable of dissipating heat fluxes of 1 $kW/cm^2$, and an index-matched undoped "cap" on the thin gain element to prevent trapping of amplified spontaneous emission, enabling high power scaling. Beam quality and wavefront aberrations can be improved through the use of aspheric and/or adaptive optics, along with understanding the impact of edge effects and deviations from ideal cooling.

The application of high power lasers to point defense systems involving aircraft and ships is an issue of great current interest. It is estimated that at least 20 kWatts of continuous-wave power is needed to defeat an incoming missile, with stringent requirements on laser beam quality. Systems like this will also be able to defend transport vehicles in enemy territory. In addition, increasing concerns about the safety of commercial aircraft also suggest that speed-of-light defenses may one day be advisable against possible Stinger (shoulder-held) missile attacks. It is believed that solid-state laser technology will ultimately be able to out-perform chemical laser systems, although the full potential of the solid-state approach has not yet been realized.

The main system considerations for laser weapon systems are: power, beam quality, efficiency, compactness and magazine depth. The power requirement of >20 kWatts, at a beam quality of a few times diffraction limited, is set by the need to "kill" an incoming missile. High efficiency is required to reduce prime power demands, while a compact system is desirable in order to deploy practical systems on aircraft or ships. The recovery time of the system between "shots" and the amount of expendable inventory (coolant, electrical energy, etc.) will determine whether the system can respond to repeated threats. Diode-pumped solid state lasers are poised to meet the requirements of a laser based point defense system, with the High-BriTE architecture incorporating cutting-edge approaches to the requirements described above.

The key to the present laser weapon invention is to pump the laser gain element with a high-radiance laser diode array, that allows the pump light from an extended array to be optically concentrated and efficiently delivered to a thin disk, in such a manner that the induced temperature gradients are aligned with the optical field in the resonator. By employing a thin gain element that is backplane-cooled, temperature gradients are achieved which do not distort the laser beam to first order. By taking this approach to the limit of an extremely thin gain medium and applying very aggressive cooling, high power densities can be achieved before reaching the ultimate limit of thermal fracture of the laser medium. In particular, the use of $Yb_3Al_5O_{12}$ (YbAG) is proposed as the laser material, where the laser active ion, $Yb^{3+}$, is present at the stoichiometric concentration ($1.4 \times 10^{22}$ ions/cm$^3$) resulting in the shortest absorption length possible while maintaining high thermal conductivity. The purity of the $Yb_3Al_5O_{12}$ must be sufficient that nonradiative processes leading to lifetime quenching and additional heating of the gain element are negligible in order to maximize optical efficiency and minimize heat generation: i.e. $\eta_{quench} \ll \eta_{quantum\ defect}$ where $\eta_{quench}$ is the heat generated as a result of nonradiative processes and $\eta_{quantum\ defect}$ is the heat generated due to the quantum defect. A significant advantage of Yb-lasers is that $\eta_{quantum\ defect}$, the heat load per absorbed pump photon, is less than ⅓ that of Nd, the most common solid state laser ion. Parasitic oscillations and amplified spontaneous emission are controlled by bonding the YBAG crystal to an appropriately configured block of index matched material so as to avoid trapping of light rays in the pumped region of the laser material. This block of index matched material may use appropriately angled faces, absorbing regions, or diffusely scattering surfaces to avoid or minimize the trapping of amplified spontaneous emission (ASE).

Figure 9:
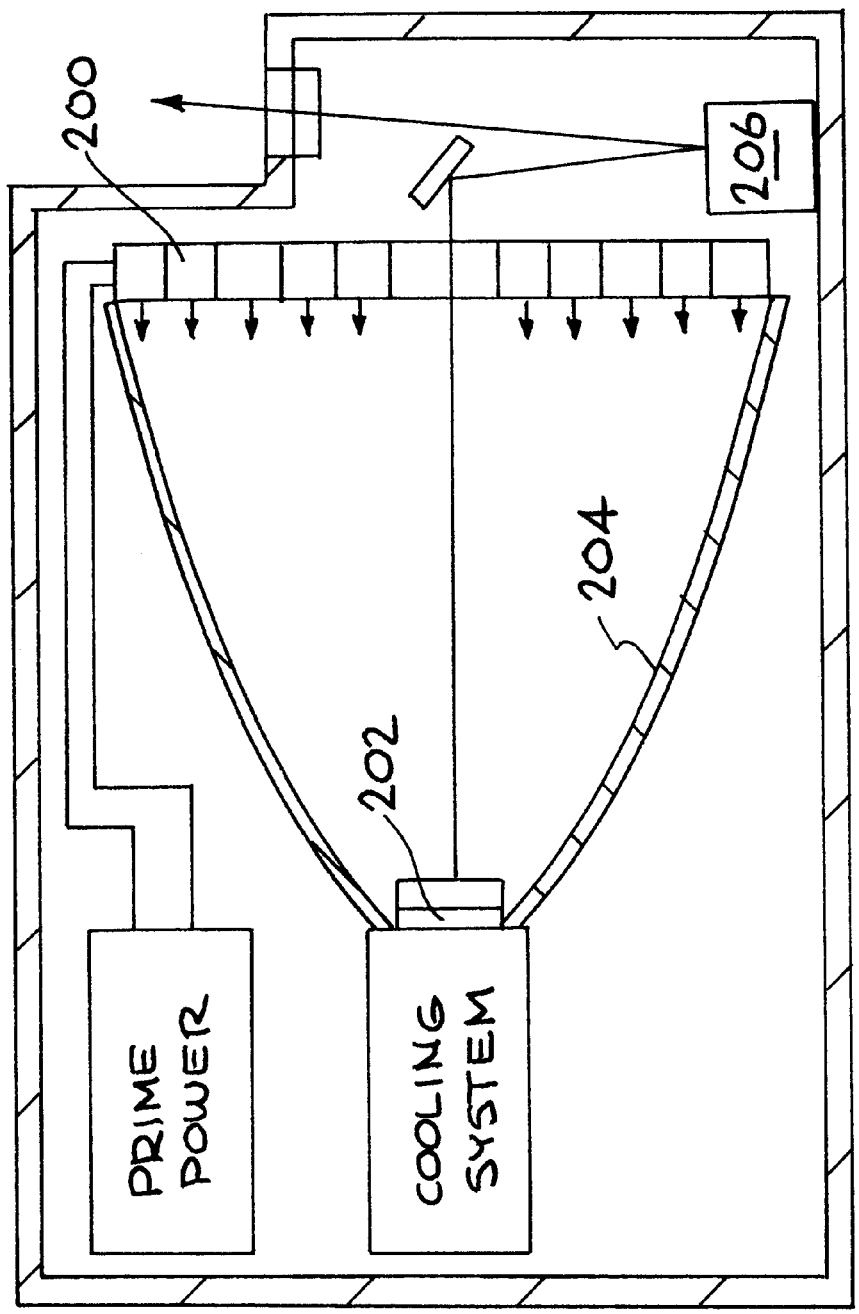
FIG. 9 shows an embodiment of a 100 kWatt class laser.

An embodiment of a 100 kWatt class laser is shown in FIG. 9. The main components are the laser diode pump arrays 200 (50×20 cm$^2$), the YbAG laser crystal 202, the hollow curved reflector 204 (hollow lens duct) used to concentrate the laser light, and an adaptive optic 206 to assure that the laser beam will be 1–2× diffraction-limited. Other variations of the laser resonator layout are also possible, for instance incorporating injection seeding or utilizing a tightly folded resonator. For this point design, 250 kW of diode pump power at 0.94 µm with a delivery efficiency of 85% is assumed, resulting in a predicted output power of 100 kW at 1.03 µM. Combined with an electrical-optical efficiency of 50% for the laser diode array, this results in an overall electrical efficiency of 20%. Even with the total system efficiency reduced somewhat due to power required for cooling, this represents an extremely efficient and compact system.

Figure 10:
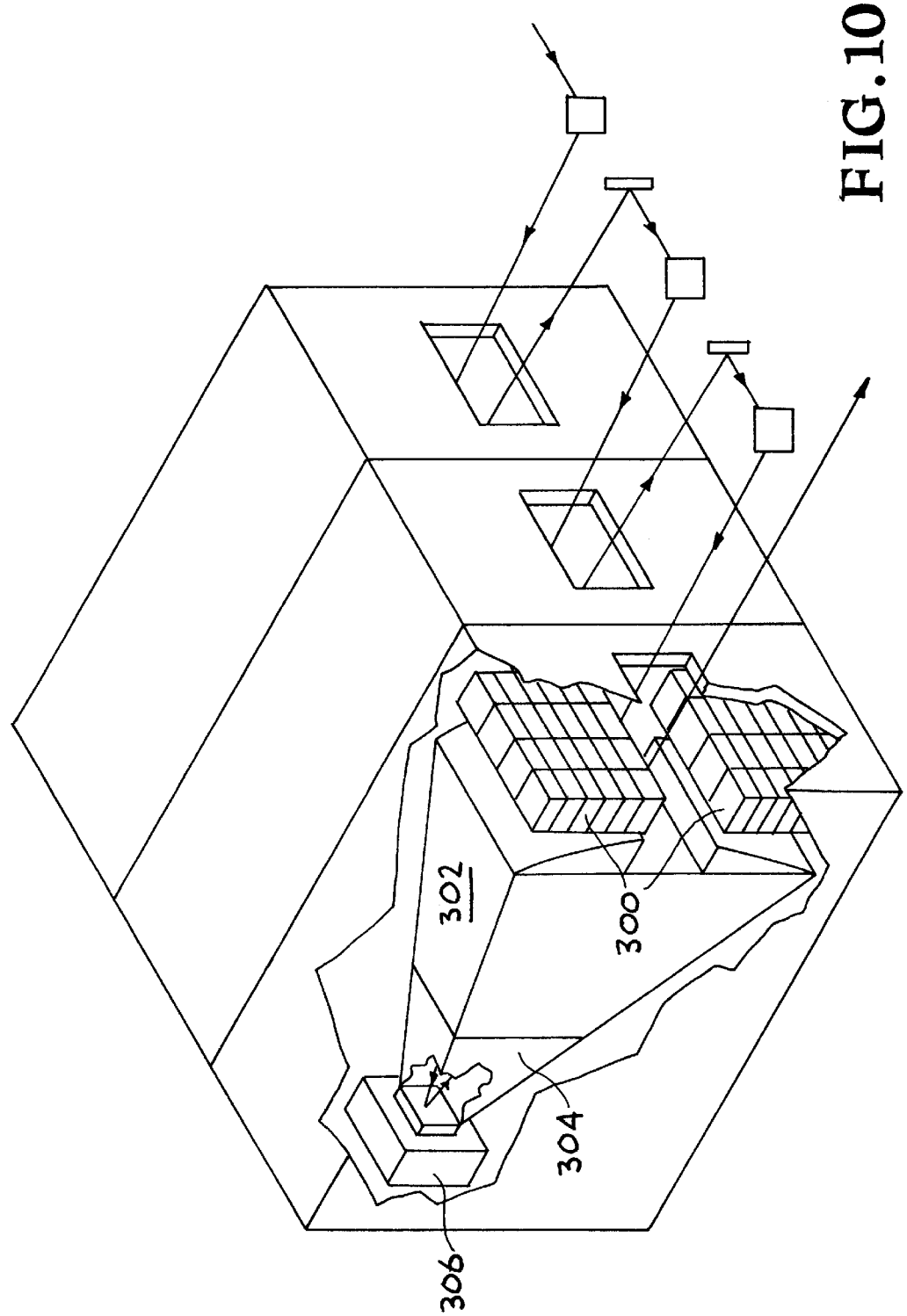
FIG. 10 shows a scaleable multimodule laser weapon system.

FIG. 10 shows a scaleable multimodule laser weapon system. Each module contains a laser diode pump array 300, delivery optics 302 (e.g. hollow lens duct) used to concentrate the pump light, a tapered undoped section 304 for parasitic suppression, the YbAG thin disk gain element and backplane cooler 306, and cavity optics (not shown) including a multilayer high reflector located between the thin disk and the backplane cooler. Angular multiplexing makes it possible to pass the extraction beam through each successive gain element.

FIG. 4 shows a cross-sectional view of the thin disk gain element and surrounding hardware used in the embodiments shown in FIGS. 3, 9 and 10. Diffusion bonded to the YbAG gain element 16, the index-matched, undoped $Y_{3-x}Lu_xAl_5O_{12}$ "cap" 22 is intended to prevent light ray paths from being totally internally reflected (TIR) back into the gain element, and a tapered undoped section 28 is used to direct the diode array output to the gain region. The YbAG layer has a dielectric multilayer stack 17 deposited on the free surface, on the side of the gain element 16 opposite from the undoped section, which serves as a high reflectivity mirror for the pump and laser beams. In this embodiment, the dielectric multilayer stack 17 is a broadband high reflector for the wavelength range of 0.94 µm to 1.03 µm. From a computer model, the optimum thickness of the YbAG layer is 150 µm, resulting in a temperature rise of 60 degrees C for the pump irradiance of 13.3 kW/cm$^2$. Although the dielectric multilayer stack is only a few microns thick, its low thermal conductivity is estimated to contribute an additional 20 degrees C in temperature rise. Thermal stresses are maximum at the free surface of the YbAG, with a maximum stress calculated to be 48% of the fracture limit. In order to dissipate the 1 kW/cm$^2$ heat flux, high-performance thermal management techniques are required. Aggressive cooling is accomplished by adapting the microchannel cooled packaging for laser diodes disclosed in U.S. Pat. No. 5,548,605, titled Monolithic Microchannel Heatsink, which is incorporated herein by reference.

The role of the undoped, index-matched $Y_{3-x}Lu_xAl_5O_{12}$ overlayer is crucial for high power operation. Amplification of spontaneous emission (ASE) limits the stored power density in large systems, by effectively reducing the excitation lifetime. The index-matched over-layer prevents trapping of ASE rays which otherwise would be totally-internally-reflected. This results in a small fraction of emitted rays intercepting sufficient gain length as to reduce the stored power density. Analytic modeling of this process shows that 100 kW operation is possible using a high reflectivity (96%) output coupler in order to reduce the saturated gain, with smaller scale systems being even more straightforward.

Changes and modifications in the specifically described embodiments can be carried out without departing from the scope of the invention, which is intended to be limited by the scope of the appended claims.

The invention claimed is:

1. A thin disk laser, comprising:
    at least one thin disk of laser-active material configured in an optical cavity, wherein each thin disk of said at least one thin disk has a first side and second side;
    an undoped cap layer affixed to each said first side, wherein said undoped cap layer reduces the amplified spontaneous emission (ASE) that may be generated within said thin disk when said thin disk is optically pumped;
    means for optically pumping said at least one thin disk; and
    means for cooling said at least one thin disk.

2. The thin disk laser of claim 1, wherein said undoped cap layer is near index matched to said thin disk of laser-active material.

3. The thin disk laser of claim 1, wherein said undoped cap layer is diffusion bonded to said thin disk.

4. The thin disk laser of claim 1, wherein said thin disk has a thickness less than about 1 mm.

5. The thin disk laser of claim 1, wherein said thin disk comprises YbAG with $Yb^{3+}$ serving as the lasing ion.

6. The thin disk laser of claim 1, wherein said means for optically pumping said thin disk comprise a laser diode array.

7. The thin disk laser of claim 6, further comprising a hollow non-imaging beam delivery optic for collecting light produced by said laser diode array.

8. The thin disk laser of claim 7, wherein said hollow non-imaging beam delivery optic comprises a hollow lensing duct.

9. The thin disk laser of claim 6, wherein said laser diode array is configured with a hole in its center to allow laser radiation produced by said thin disk to exit.

10. The thin disk laser of claim 8, further comprising a tapered undoped crystal placed between said hollow lens duct and said undoped cap layer to further reduce ASE.

11. The thin disk laser of claim 10, wherein said tapered undoped crystal is near index matched to said undoped cap layer.

12. The thin disk laser of claim 10, wherein said tapered undoped crystal comprises the same material as that of said undoped cap layer.

13. The thin disk laser of claim 8, wherein said undoped cap layer further comprises a tapered undoped crystal to provide a further means for reducing ASE.

14. The thin disk laser of claim 8, wherein said undoped cap layer is diffusion bonded to said tapered undoped crystal.

15. The thin disk laser of claim 1, wherein said undoped cap layer further comprises a tapered undoped crystal affixed to said undoped cap layer on the side of said undoped cap layer that is opposite from said thin disk, wherein said tapered undoped crystal further reduces ASE.

16. The thin disk laser of claim 15, wherein said tapered undoped crystal is near index matched to said undoped cap layer.

17. The thin disk laser of claim 15, wherein said tapered undoped crystal comprises the same material as that of said undoped cap layer.

18. The thin disk laser of claim 15, wherein said undoped cap layer is diffusion bonded to said tapered undoped crystal.

19. The thin disk laser of claim 1, wherein said thin disk is attached to a high performance cooled backplane.

20. The thin disk laser of claim 8, wherein said thin disk comprises Yb:YAG and said lens duct comprises undoped YAG.

21. The thin disk laser of claim 1, wherein said optical cavity comprises an output coupler and a high reflector.

22. The thin disk laser of claim 21, wherein said optical cavity comprises a brewster angled optical cavity comprising said output coupler and said high reflector, wherein said optical cavity is configured such that light oscillating within said optical cavity travels through said thin disk substantially perpendicular to the direction of light delivered to said thin disk by said means for optically pumping said thin disk, wherein light that is oscillating within said optical cavity enters and exits said thin disk substantially at Brewster's angle.

23. The thin disk laser of claim 1, wherein said means for cooling said thin disk comprise a cooling block, wherein said optical cavity is formed by a highly reflective coating affixed onto said second side of said thin disk, wherein said highly reflective coating is in contact with said cooling block, wherein an output coupler laser mirror is located between said means for optically pumping said thin disk and said undoped cap layer, wherein said output coupler is coated to allow passage of pump radiation from said means for optically pumping said thin disk.

24. The thin disk laser of claim 1, wherein said optical cavity is formed by an output coupler laser mirror and a highly reflective coating affixed onto said second side of said thin disk, wherein said highly reflective coating is in contact with said means for cooling said thin disk, wherein said output coupler laser mirror is located between said means for optically pumping said thin disk and said undoped cap layer, wherein said output coupler is coated to allow passage of pump radiation from said means for optically pumping said thin disk.

25. The thin disk laser of claim 24, wherein said highly reflective coating comprises a dielectric multilayer stack.

26. The thin disk laser of claim 25, wherein said dielectric multilayer stack comprises a broadband high reflector for the wavelength range of 0.94 $\mu$m to 1.03 $\mu$m.

27. The thin disk laser of claim 26, wherein said thin disk comprises YbAG.

28. The thin disk laser of claim 1, wherein said thin disk comprises $Yb_3Al_5O_{12}$.

29. The thin disk laser of claim 28, wherein said $Yb_3Al_5O_{12}$ has a purity such that nonradiative processes leading to lifetime quenching result in a negligible impact on heat generation and optical efficiency.

30. The thin disk laser of claim 19, wherein said high performance cooled backplane is capable of dissipating heat fluxes of 1 kW/cm$^2$.

31. The thin disk laser of claim 5, wherein said $Yb^{3+}$ is present at the stoichiometric concentration of $1.4 \times 10^{22}$ ions/cm$^3$.

32. The thin disk laser of claim 6, wherein said laser diode array is capable of providing 250 kW of diode pump power at 0.94 $\mu$m.

33. The thin disk laser of claim 1, wherein said undoped cap layer comprises $Y_{3-x}Lu_xAl_5O_{12}$.

34. The thin disk laser of claim 1, further comprising an output optic selected from a group consisting of aspheric and adaptive optics, wherein said output optic is positioned such that a laser beam produced by said thin disk laser will reflect from said output optic, wherein said output optic is used for wavefront correction.

35. A thin disk laser, comprising:
at least one gain medium comprising a thin disk having a thickness less than about 1 mm;
a transparent optical material bonded to said gain medium, wherein said transparent optical material has substantially the same refractive index as said gain medium; and
a laser diode array for optically pumping said gain medium.

36. The thin disk laser of claim 35, wherein said laser diode array is situated with its emitting light aperture parallel to the face of said gain medium and pump radiation is delivered with a hollow optics element.

37. The thin disk laser of claim 35, wherein said gain medium generates a laser beam that is substantially perpendicular to said gain medium.

38. The thin disk laser of claim 35, wherein said gain medium comprises $Yb_xY_{3-x}Al_5O_{12}$.

39. The thin disk laser of claim 35, wherein said transparent optical material has a thickness greater than about five times that of said gain medium.

40. The thin disk laser of claim 35, wherein said thin disk laser produces an output beam that is delivered through an aperture in said laser diode array.

41. The thin disk laser of claim 35, wherein said thin disk laser produces an output power that is greater than 100 kW.

42. The thin disk laser of claim 35, wherein said transparent optical material has canted sides to further concentrate the pump light from said laser diode array.

43. The thin disk laser of claim 35, wherein said thin disk laser is configured within an oscillator configuration incorporating an output coupling optic.

44. The thin disk laser of claim 36, wherein said hollow optics element comprises a lens duct.

45. The thin disk laser of claim 35, wherein said transparent optical material comprises $Y_{3-x'}Lu_{x'}Al_5O_{12}$ where x' is adjusted to give said transparent optical material substantially the same refractive index as said laser material.

46. A method of producing laser light, comprising:

providing at least one thin disk of laser-active material configured in an optical cavity, wherein each thin disk of said at least one thin disk has a first side and second side;

providing an undoped cap layer affixed to each said first side, wherein said undoped cap layer reduces the amplified spontaneous emission (ASE) that may be generated within thin disk when said thin disk is optically pumped;

optically pumping said at least one thin disk; and cooling said at least one thin disk.

47. A method of producing laser light, comprising:

optically pumping at least one thin disk of laser-active material configured in an optical cavity, wherein each thin disk of said at least one thin disk has a first side and second side;

reducing the amplified spontaneous emission (ASE) that may be generated within said thin disk when said thin disk is optically pumped, wherein said ASE is reduced by affixing an undoped cap layer to each said first side; and cooling said at least one thin disk.

* * * * *